United States Patent
Miller et al.

(10) Patent No.: US 10,050,453 B2
(45) Date of Patent: Aug. 14, 2018

(54) PORTABLE POWER ADAPTER WITH DETACHABLE BATTERY UNIT

(71) Applicant: Halo2Cloud LLC, Glastonbury, CT (US)

(72) Inventors: Garold C. Miller, Glastonbury, CT (US); Nathan Daniel Weinstein, Glastonbury, CT (US)

(73) Assignee: HALO INTERNATIONAL SEZC LTD., Georgetown (KY)

( * ) Notice: Subject to any disclaimer, the term of this patent is extended or adjusted under 35 U.S.C. 154(b) by 253 days.

(21) Appl. No.: 15/075,805

(22) Filed: Mar. 21, 2016

(65) Prior Publication Data

US 2016/0276856 A1    Sep. 22, 2016

Related U.S. Application Data

(60) Provisional application No. 62/135,398, filed on Mar. 19, 2015.

(51) Int. Cl.
*H02J 7/00*    (2006.01)

(52) U.S. Cl.
CPC .................. *H02J 7/0042* (2013.01)

(58) Field of Classification Search
USPC .................................. 320/111–113
See application file for complete search history.

(56) References Cited

U.S. PATENT DOCUMENTS

| | | |
|---|---|---|
| 5,901,056 A | 5/1999 | Hung |
| D478,310 S | 8/2003 | Andre et al. |
| D478,546 S | 8/2003 | Andre et al. |
| 6,894,457 B2 | 5/2005 | Germagian et al. |
| 7,011,538 B2 | 3/2006 | Chang |
| 7,273,384 B1 | 9/2007 | So |
| D599,737 S | 9/2009 | Amidei et al. |
| D599,738 S | 9/2009 | Amidei et al. |
| 7,597,570 B2 | 10/2009 | So |
| D610,094 S | 2/2010 | Ouimette et al. |
| D616,363 S | 5/2010 | Weng |
| 7,766,698 B1 | 8/2010 | De Iuliis et al. |
| D628,151 S | 11/2010 | Wegener et al. |
| D628,152 S | 11/2010 | Fujii et al. |
| D628,153 S | 11/2010 | Fujii et al. |
| D636,725 S | 4/2011 | Levy et al. |
| D641,695 S | 7/2011 | Wegener et al. |

(Continued)

*Primary Examiner* — Paul Dinh

(74) *Attorney, Agent, or Firm* — McCormick, Paulding & Huber LLP

(57) ABSTRACT

A power adapter has an adapter housing, AC to DC power conversion circuitry disposed within the adapter housing, a positive power contact and a negative power contact disposed on the adapter housing and operatively connected with the power conversion circuitry, AC wall outlet prongs mounted in one of the faces and operatively connected with the power conversion circuitry, a DC power connection interface connected by a cable to the adapter housing, wherein the cable operatively connects the DC power connection interface with the power conversion circuitry; and a magnet disposed in the first face of the adapter housing. The magnet and the power contacts of the power adapter mate with corresponding magnet and power contacts of a battery unit, which also includes a battery housing and an electrolyte disposed within the battery housing.

20 Claims, 9 Drawing Sheets

(56) References Cited

U.S. PATENT DOCUMENTS

| | | |
|---|---|---|
| D647,476 S | 10/2011 | Ciou |
| D649,017 S | 11/2011 | Stieler |
| D656,096 S | 3/2012 | Sasada et al. |
| D659,093 S | 5/2012 | Schmid et al. |
| D666,968 S | 9/2012 | Huang |
| D667,788 S | 9/2012 | Mai |
| D674,748 S | 1/2013 | Ferber et al. |
| D676,377 S | 2/2013 | Nokuo |
| D680,063 S | 4/2013 | Sasada |
| D682,196 S | 5/2013 | Leung |
| D682,197 S | 5/2013 | Leung |
| D694,185 S | 11/2013 | Matsuoka et al. |
| D712,829 S | 9/2014 | Huang |
| D720,288 S | 12/2014 | Ko |
| D722,959 S | 2/2015 | Bulgarov et al. |
| D738,303 S | 9/2015 | Symons |
| D740,750 S | 10/2015 | Mayden et al. |
| D757,014 S | 5/2016 | Hahn et al. |
| D772,813 S | 11/2016 | Wahl |
| D777,103 S | 1/2017 | Park |
| 2005/0009404 A1 | 1/2005 | Lee |
| 2008/0048609 A1* | 2/2008 | Kuhlmann ............ H02J 7/0042 320/107 |
| 2011/0148344 A1 | 6/2011 | Manor et al. |
| 2013/0119181 A1 | 5/2013 | Fan |
| 2015/0188339 A1 | 7/2015 | Green et al. |
| 2016/0380446 A1 | 12/2016 | Loewen |

\* cited by examiner

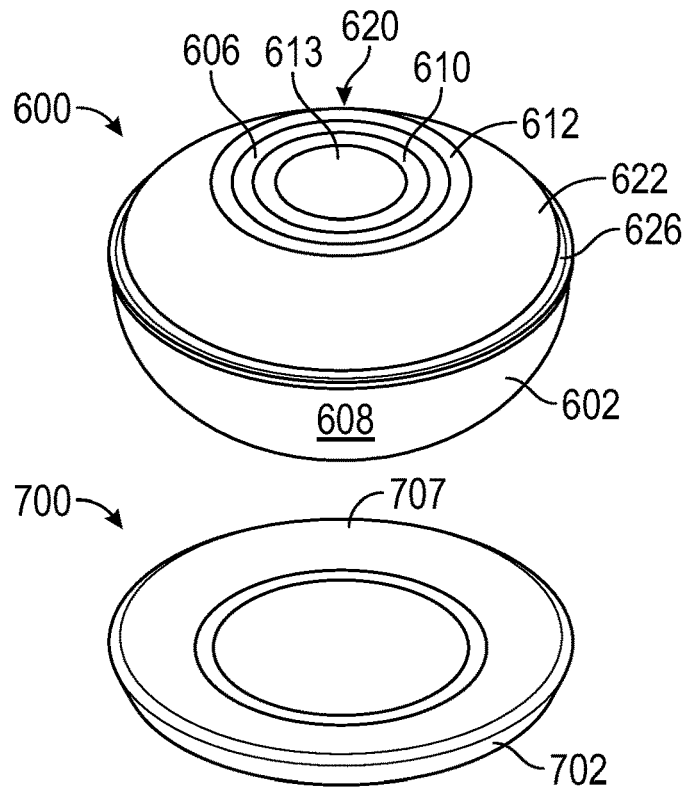
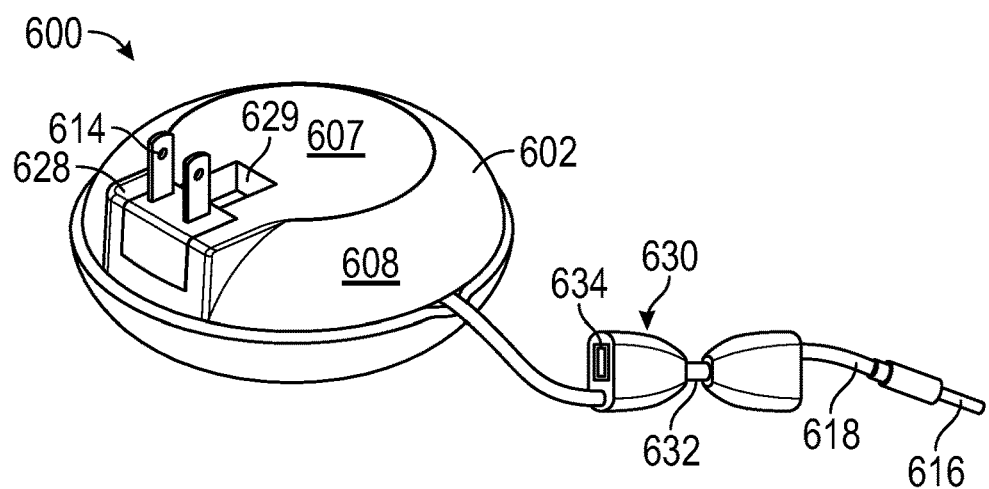

PORTABLE POWER ADAPTER WITH DETACHABLE BATTERY UNIT

CROSS-REFERENCE RELATED APPLICATIONS

This application is a non-provisional and claims the benefit under 35 USC § 119(e) of U.S. patent application Ser. No. 62/135,398, filed Mar. 19, 2015, which is incorporated herein by reference in its entirety.

FIELD OF INVENTION

The present invention generally relates to power adapters for charging portable electronic devices, and more particularly relates to a portable power adapter having a detachable and separately rechargeable battery unit.

BACKGROUND OF THE INVENTION

Present day consumers typically own a laptop computer, which requires charging from a wall socket using a power adapter for converting the AC wall socket power to DC power at a lower voltage. Additionally, consumers typically own several smaller electronic devices such as a cell phone, a music player, a camera, etc. These smaller devices also require charging, either from a port of the laptop (e.g., a USB port) or through their own power adapters when connected to an external power source. It can be challenging to find enough wall sockets to recharge all of a consumer's electronic devices in a single convenient location. Additionally, most laptops only have a limited number of ports which cannot be used to charge multiple devices when the ports are already being used.

Additionally, it can become necessary to recharge an electronic device when no wall socket is available. On occasion, an electronic device needs a small amount of charge to finish a task before the device powers down due to insufficient battery capacity. For example, a user on a call using a mobile phone may wish to finish the call, but cannot find a power source to plug into, or may not have enough time to get to a power source. As noted, if the phone is plugged into a traditional power source, like a wall socket, it is difficult to continue using the phone as desired. Accordingly, what is needed is a power charger, even with a small boost of power, that is as portable as the electronic device and preferably easy to carry with the electronic device and the appropriate charging cable, and thus easily usable on-the-go.

Further, portable power chargers designed for use on-the-go must be suitable to a variety of conditions, as they are often most in need where a standard external power source is not available, and thus often needed when there is no power at all. For example, a portable power charger is especially useful when walking, camping, at the park, at the mall, or at a sporting event, where one may need to use a phone in an emergency situation. In such situations, the user doesn't want to have to carry too many objects, and this may not be able to carry a large power charger, even if portable, and one or more charging cables in addition to an electronic device (e.g., smart phone). Accordingly, a portable power charger that is easy to carry around without taking up too much space is desirable.

Portable power chargers, however, typically require their own charging cables and power adapters for recharge from a wall socket. Thus, in the context of recharging electronic devices at home, portable power chargers only add to the difficulty of finding enough wall sockets all in the same place. In particular, a typical wall socket has only two outlets. Thus, it can be difficult to recharge a portable power charger while at the same time recharging a laptop and another electronic device such as a mobile phone.

In view of the foregoing, there is a need for a combination power adapter and portable battery that can expand the options for recharging not only a portable laptop, but multiple additional electronic devices at the same time. Accordingly, there is a need for a power adapter that can be used in the traditional manner to recharge a laptop when connected to a power source, such as a wall socket, but also capable of recharging the laptop when no external power source is readily available. There is also a need for such a power adapter that can be used to recharge portable electronic devices, including but not limited to smart phones, mobile phones, data tablets, music players, cameras, camcorders, gaming units, e-books, Bluetooth® devices, GPS devices, and the like, either through connection with a laptop or directly from the portable power adapter. Still further, there is a need for a power adapter having a compact size and aesthetically pleasing design that has increased functionality for a user requiring a source of power for multiple devices. Accordingly, it is a general object of the present invention to provide a combination power adapter and portable power source that improves upon conventional power adapters currently on the market and that overcomes the problems and drawbacks associated with such prior art power adapters.

SUMMARY OF THE INVENTION

Embodiments of the present invention relate to a universal portable power adapter assembly for charging multiple portable electronic devices, including laptop computers and smart phones, while on the road or in the comfort of one's own home. The power adapter assembly comprises a power adapter and a detachable battery unit. The compact "puck" design of the power adapter includes a power input interface, such as an AC wall plug, and retractable or wind-up DC power output cable adapted for connection to a portable laptop and/or various portable electronic devices for recharging such devices. Additionally, multiple USB ports may be included on the power adapter, the battery unit and/or the power output cable so that multiple electronic devices can be recharged at the same time. The detachable battery unit has a complementary "puck" design that is stackable with the power adapter, and can be recharged from the power adapter while the DC power cable and the USB ports are in use to recharge electronic devices.

The power adapter assembly may be used either when connected to an external power source, such as an AC wall socket, or when disconnected from such an external power source, provided there is ample charge in the battery unit. In this regard, the power adapter may be connected to a laptop or a device via the DC power output cable, or may include power output connection ports to which devices can be connected for recharging from the external power source or the battery unit. The detachable battery unit may also have multiple power output connection ports (e.g., USB ports) that provide additional charging capacity for multiple electronic devices without the need for an external power source, such as an AC wall socket.

As noted, the power adapter assembly can act as a portable power charger as the detachable battery unit provides additional charging capacity for multiple electronic devices without the need for an external power source, such as an AC wall socket. In use, one simply plugs the power adapter (with or without the battery unit attached) into an AC wall socket to provide a power charge through the adapter to a connected electronic device (either at the end of the DC power cable or via connection ports on the housing or cable). Additionally, when the battery unit is attached to the charging device, the power supplied from the wall socket via the adapter can recharge the portable battery unit as well as all connected devices all at once. When the power adapter is unplugged from the outlet, it can continue to deliver power to attached electronic devices from the battery unit.

Additionally, the detachable battery unit can be attached to compatible electronic devices via its unique configuration of voltage ring contacts. The battery includes multiple positive voltage rings of differing potential, which align with corresponding pins on compatible devices. This allows for the voltage connection to be determined by the pins' diametrical position. In certain embodiments the battery unit also is supplied with corresponding pins on the face opposite the voltage rings, so that it can be stacked with additional complementary batteries. Thus it is possible to attach multiple batteries to one charger to provide even longer portable power capacity.

These and other objects, features and advantages of the present invention will become apparent in light of the detailed description of embodiments thereof, as illustrated in the accompanying drawings.

DESCRIPTION OF THE DRAWINGS

FIG. 15 shows in perspective view a portable power adapter and a detachable battery unit according to a fourth embodiment of the present invention.

FIG. 16 shows in bottom perspective view the portable power adapter of FIG. 15.

DETAILED DESCRIPTION OF PREFERRED EMBODIMENTS

Figure 1:
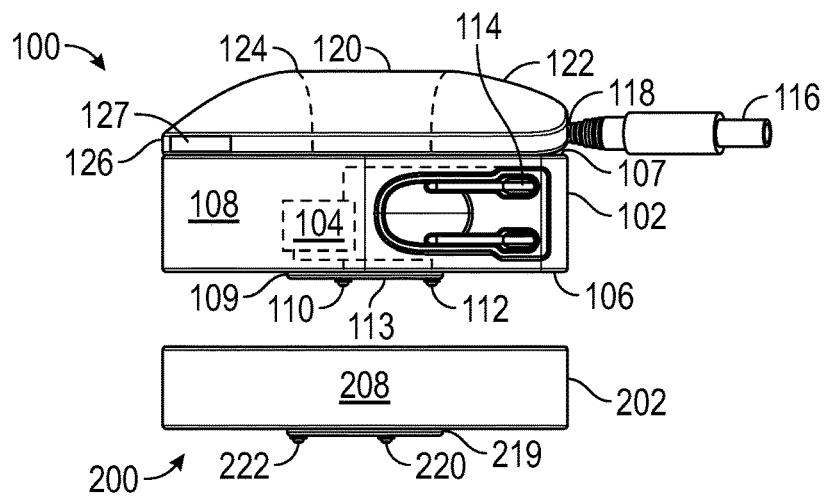
FIG. 1 shows in planar side view a portable power adapter and a detachable battery unit, according to a first embodiment of the present invention.

A portable power adapter assembly in accordance with an embodiment of the present invention is shown in FIGS. 1-10. The power adapter assembly includes a portable power adapter 100 and a detachable battery unit 200, as illustrated in FIG. 1. In preferred embodiments of the present invention, the power adapter 100 and the battery unit 200 are designed to be magnetically connected together and operatively electrically connected by way of positive and negative electrical contacts, as further discussed below. In alternative embodiments, the structural connection between the adapter 100 and the battery unit 200 can be by mechanical means.

Figure 2:
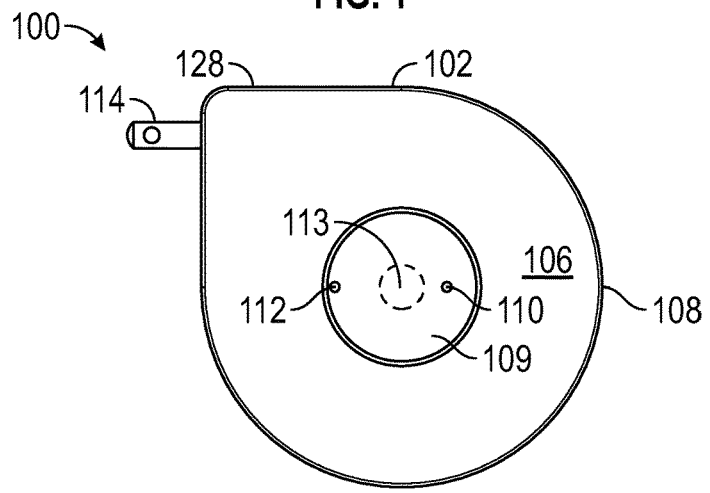
FIG. 2 shows in planar bottom view the portable power adapter of FIG. 1.
Figure 3:
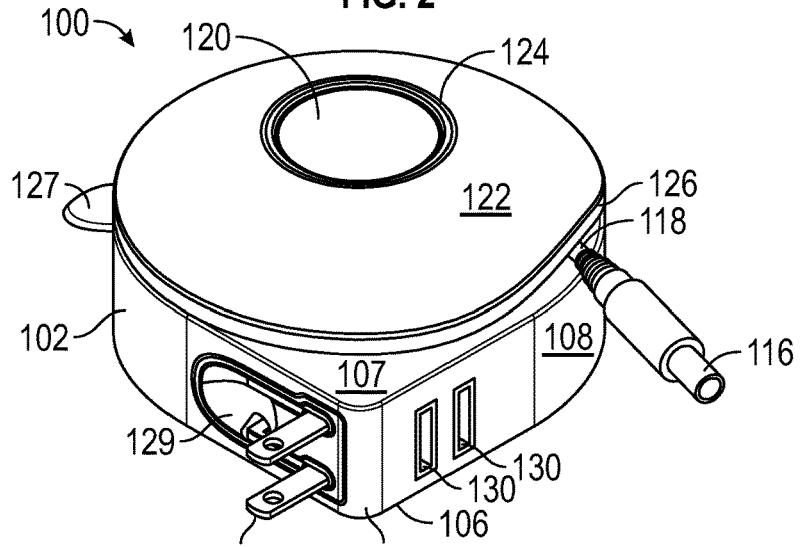
FIG. 3 shows in perspective view the portable power adapter of FIG. 1.

Referring to FIGS. 1-3, the portable power adapter 100 comprises an adapter housing 102, which houses power conversion circuitry 104. The adapter housing 102 includes a first face 106, which is shown as a flat generally circular face. The adapter housing 102 also includes a generally flat and generally circular second face 107 that opposes the first face 106, and includes a generally circular peripheral face 108 that surrounds and connects the first and second faces.

In operation, the power conversion circuitry 104 converts AC power to DC power. The power conversion circuitry 104 is operatively connected to receive the AC power from AC wall outlet prongs 114 adapted for engagement with a standard U.S. AC wall socket, and is further operatively connected to supply the converted DC power to pin contacts 110, 112 provide on the surface of the adapter housing 102 as well as to a DC power cable 118 having a connection interface 116 adapted for connected with a laptop and/or a portable electronic device. Still further, the power conversion circuitry 104 can be operatively connected with power connection input and output ports provided on the adapter 100 for receiving or outputting power. Typically, the power conversion circuitry 104 provides relatively high voltage DC Power—e.g., +19 VDC—to the DC power interface 116 for charging a laptop or the like. The power conversion circuitry 104 also provides the same relatively high voltage DC power to the pin contacts 110, 112 for recharging the battery unit 200 when connected to the adapter 100, as further discussed below. The power conversion circuitry 104 also may produce intermediate DC power—e.g., +5 VDC—for charging USB devices that may be connected to the adapter 100 via power output connection ports. This intermediate DC power is provided, for example, to USB output ports 130, illustrated in FIG. 3.

Referring to FIG. 2, the contact pins 110, 112 are mounted in a protrusion 109 that is formed on the first (bottom) face 106 of the adapter housing 102. The protrusion 109 generally comprises a raised cylindrical surface for physically locating the battery unit 200 for interconnection. The contact pins 110, 112 are preferably spring-loaded within the protrusion 109 and radially aligned with fixed contact circles located on the upper surface of the detachable battery unit 200 when interconnected with the adapter 100. Also mounted in the protrusion 109 is a magnet 113 that assists in attaching the battery unit 200 onto the power adapter 100 as further discussed below.

As illustrated in FIG. 105, a flip out wall plug is provided for connection to an AC wall socket. In FIG. 1, for example, the plug is illustrated in its stored position within a cavity 129 formed in the adapter housing 102. In FIG. 3, the wall plug is pivoted to an outwardly projecting position for use. Thus, the AC wall outlet prongs 114 are pivotally mounted in the peripheral face 108 of the adapter housing 102 so that they are movable between the retracted position within the adapter housing 102 and the deployed position protruding from the adapter housing. In their retracted position, the wall outlet prongs 114 are stowed within the cavity 129 that is formed in the peripheral face 108 of the adapter housing 102 so that they are contained within the general footprint of the adapter housing 102 and do not interfere with transport or storage of the power adapter assembly. The cavity 129 provides room for a finger to be inserted for extracting the prongs 114.

Figure 4:
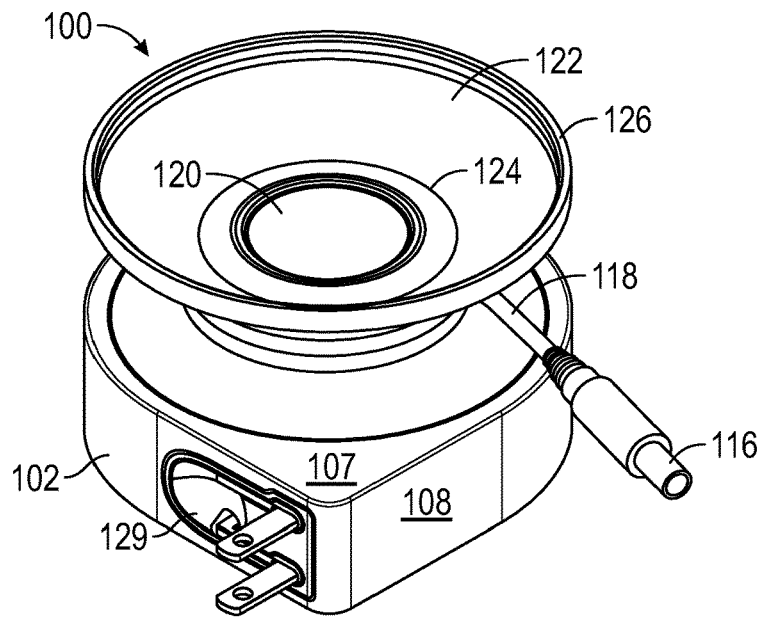
FIG. 4 shows in perspective view the portable power adapter of FIG. 1 with a flex cover opened to expose a power cable.
Figure 5:
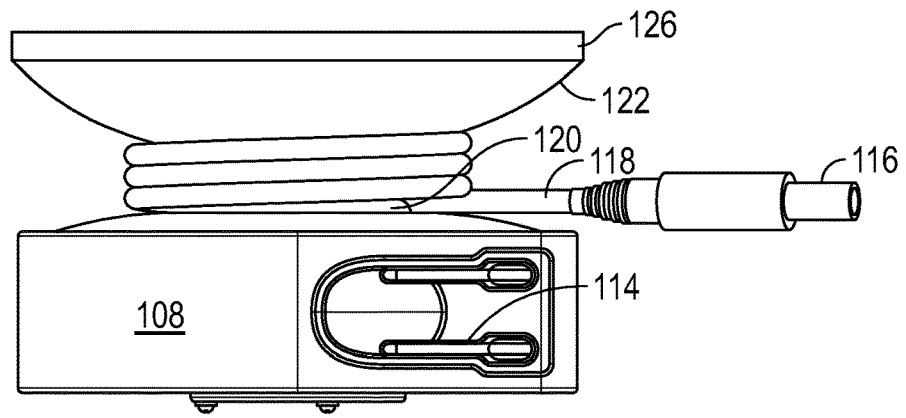
FIG. 5 shows in planar side view the portable power adapter of FIG. 4 with the flex cover opened.
Figure 11:
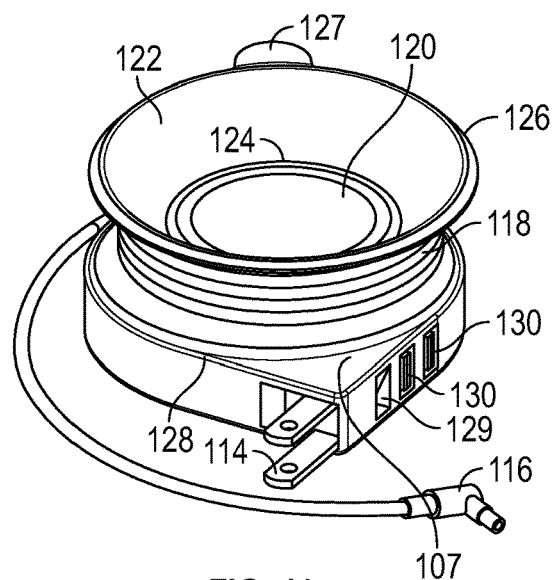
FIG. 11 shows in perspective view a portable power adapter according to a second embodiment of the present invention.

The DC power interface 116 at the end of the power cable 118 is operatively connected with the power conversion circuitry 104 via the cable 118. The cable 118 can be wrapped around a spindle 120, which protrudes from the second face 107 of the adapter housing 102. When the cable 118 is wrapped around the spindle 120, it can be covered by a flexible cover or shroud 122. The flexible cover 122 has an inner edge 124, which is attached to the spindle, and has an outer edge 126, which is freely movable. The outer edge 126 of the flexible cover 122 can be moved from a closed position, proximate to the adapter housing 102, to an open position distant from the adapter housing. In its closed position the flexible cover 122 conceals the wrapped cable 118. In its open position the flexible cover 122 exposes the wrapped cable 118, as illustrated in FIGS. 4-5, so that the cable 118 is free to be unwrapped or wrapped in an expeditious fashion. The flexible cover 122 is generally parabolic or frustoconical in shape and is elastic, so that it can be snapped or popped between its two positions. The flexible cover 122, as illustrated, is preferably made from TPR, silicone, or TPE. The flexible cover 122 may include a tab 127 provided at its outer edge 126, as illustrated in the embodiment of FIG. 11, for ease of moving the cover between closed and open positions.

Referring to FIG. 2, the power adapter 100 is shown alone in a planar bottom view. The generally circular adapter housing 102 includes a corner portion 128 in which the wall outlet prongs 114 are pivotally mounted. The first or bottom surface 106 of the power adapter 100 includes the cylindrical protrusion 109, in which the positive contact pin 110 and the negative contact pin 112 are mounted. The magnet 113 also is mounted in the protrusion 109. As shown, the magnet 113 is located centrally to the protrusion 109, between the positive and negative contact pins 110, 112. However, the magnet 113 can equally be arranged as a plurality of magnets spaced around the protrusion 109 or even across the bottom surface 106 outside the protrusion 109, provided complementary magnets are similarly located in the battery unit 200 for interconnection.

Referring to FIG. 3, the power adapter 100 may include one or more power output connection ports 130 formed in the corner portion 128 of the adapter housing 102. The power output connection ports 130 are illustrated as USB connection ports. However, any known connection port, including but not limited to mini-USB and micro-USB type ports, may be used without departing from the spirit and principles of the present invention. The power output connection ports 130 are operatively connected with the power conversion circuitry 104 to supply a standard charging power profile—e.g., USB 2.0 standard 2 A at +5 VDC.

Figure 6:
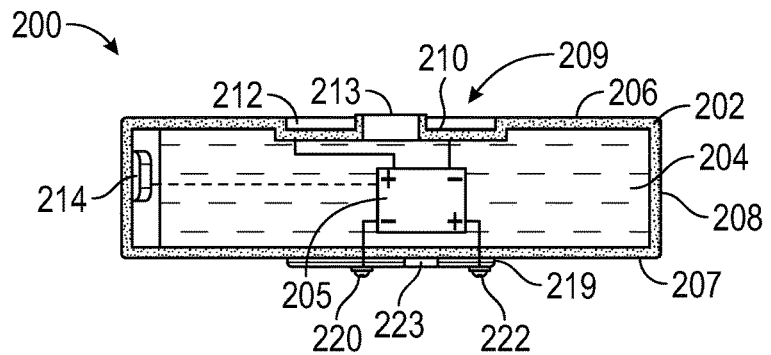
FIG. 6 shows in side cross-sectional view the battery unit of FIG. 1.

FIG. 6 shows a cross-sectional side view of the battery unit 200. In preferred embodiments, the battery unit uses a Lithium-Ion battery that can be recharged by connection to an external power source. The battery unit 200 includes a battery housing 202, which encases an electrolyte 204 and charging circuitry 205. The battery housing 202 has a generally circular upper first surface 206, a generally circular lower second surface 207, and an annular peripheral surface 208. As illustrated, the battery housing 202 includes an indentation 209 on upper surface 206 for engagement with the protrusion 109 of the adapter unit 100, discussed above. The battery unit 200 also includes a protrusion 219 on the lower surface 207, on which positive and negative electrical pin contacts 220, 222 are provided for engagement with another battery unit for increased power, as discussed further below.

The charging circuitry 205 operatively connects the electrolyte 204 with positive and negative contacts 210, 212 that are provided in the indentation 209 in the first face 206 of the battery housing 202. These positive and negative contacts 210, 212 are fixed rings that are radially aligned with the contact pins 110, 112 of the power adapter 100. The positive contact ring 210 is operatively connected with the charging circuitry 205 to provide the battery high voltage—e.g., +19 VDC—for charging the battery unit 200 or for recharging a relatively high voltage load (e.g., a laptop) from the battery unit 200. The negative contact ring 212 is operatively connected with the charging circuitry 205 at the battery ground. The potential difference between the positive contact ring 210 and the negative contact ring 212 may be the full cell potential of the electrolyte 204. One or more intermediate positive contact rings 211a, 211b may be provided at lesser voltages (partial cell potential differences from ground)—e.g., +5 VDC or +14 VDC from battery ground—according to the specifications of various compatible devices that may be powered from the battery unit 200.

The indentation 209 formed in the top face 206 of the battery unit 200 is preferably a cylindrical indentation having a complementary size and shape to the protrusion 109 on the adapter 100. The cylindrical indentation 209 is used to physically locate the complementary protrusion 109 for interconnection of the adapter 100 with the battery unit 200. When so interconnected, the contact pins 110, 112 of the adapter are aligned with the fixed contact circles 210, 212 of the battery unit 200. Also provided in the indentation 209 is a first magnet 213, which complements the magnet 113 of the adapter housing 102. Thus, the battery unit 200 is attachable to the power adapter 100 by interaction of the respective magnets 213, 113. In alternative embodiments, the structural connection between the adapter 100 and the battery unit 200 can be by mechanical means.

At the peripheral surface 208 of the battery housing 202, at least one power connection port 214 is provided that can be either a power input connection, a power output connection, or both, such as shown and described in Applicants' co-pending U.S. application Ser. No. 13/682,985, incorporated herein by reference. The power connection port 214 may be, for example, a USB, mini-USB, or micro-USB type port, or the like. The charging circuitry 205 operatively connects the power connection port 214 with the electrolyte 204.

The charging circuitry 205 also operatively connects the electrolyte with second positive and negative contacts 220, 222, which are provided in the protrusion 219 at the lower second face 207 of the battery housing 202. Also provided in the protrusion 219 is a second magnet 223. The protrusion 219 and the second contacts 220, 222 are respectively aligned in registry with the indentation 209 and the first contacts 210, 212. The second positive contact 220, which is a pin-type contact, is operatively connected with the charging circuitry 205 at the battery high voltage (e.g., +19 VDC). The second negative contact 222, which also is a pin-type contact, is operatively connected with the charging circuitry 205 at the battery ground. Thus, multiple battery units of similar design can be stacked together by interaction of their magnets 213, 223. The operative connections of the charging circuitry 205 with the first contacts 210, 212 and with the second contacts 220, 222 provide for parallel electrical connection of battery units that are stacked together in this manner.

Figure 7:
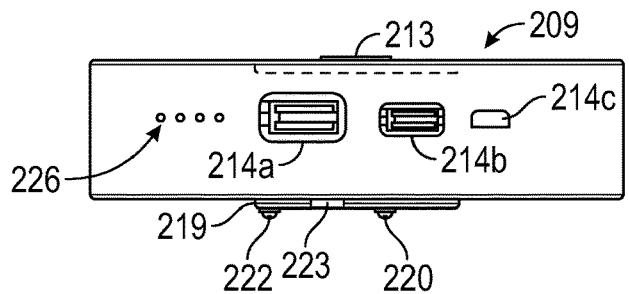
FIG. 7 shows in planar side view the battery unit of FIG. 1.

Referring to FIG. 7, a plurality of power connection ports 214a, 214b, 214c are shown. The ports 214a, 214b, 214c are of differing configurations—i.e., USB, Apple® Lightning, and micro-USB. One connection port—e.g., port 214c—may operate as a power input connection port for recharging the battery unit 200 from an external power source, while the other two connection ports—e.g., ports 214a and 214b—may operate as power output connection ports for recharging electronic devices from the power adapter assembly. The ports 214 may be operatively connected with the charging circuitry 205 at an intermediate voltage (+5 VDC). Generally, the ports 214 are operatively connected with the charging circuitry 205 via diodes for one-way power transfer. However, it is possible to configure the charging circuitry 205 to provide a charge from one of the ports 214 to the electrolyte 204. For example, a step-up power converter can be included in the charging circuitry 205 to convert standard USB 2.0 voltage and current from one of the ports 214 (2 A at +5 VDC) to voltage and current suitable for charging the electrolyte 204 (e.g., 0.45 A at +20 VDC).

Also shown at the peripheral surface 208 of the battery housing 202 is a power indicator means 226, which can include a microprocessor that illuminates a series of LEDs according to battery charge to indicate the charge level of the battery unit 200. For example, all of the lights may be illuminated to indicate a full charge, while only some of the lights may be illuminated to indicate a partial charge, while none of the lights would be illuminated when the battery is depleted. The power indicator means 226 is operatively connected with the charging circuitry 205 for monitoring the state of charge in the electrolyte 204—i.e., by tracking how much current has gone in or out at what voltage and for how long.

Figure 8:
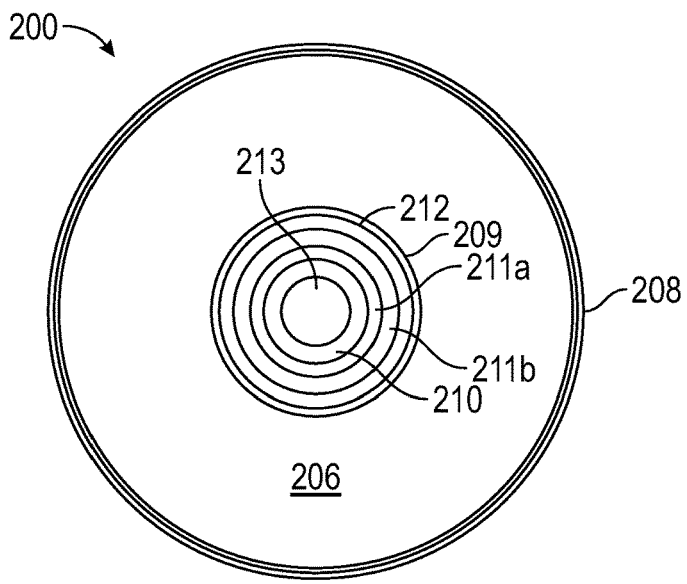
FIG. 8 shows in planar top view the battery unit of FIG. 1.
Figure 9:
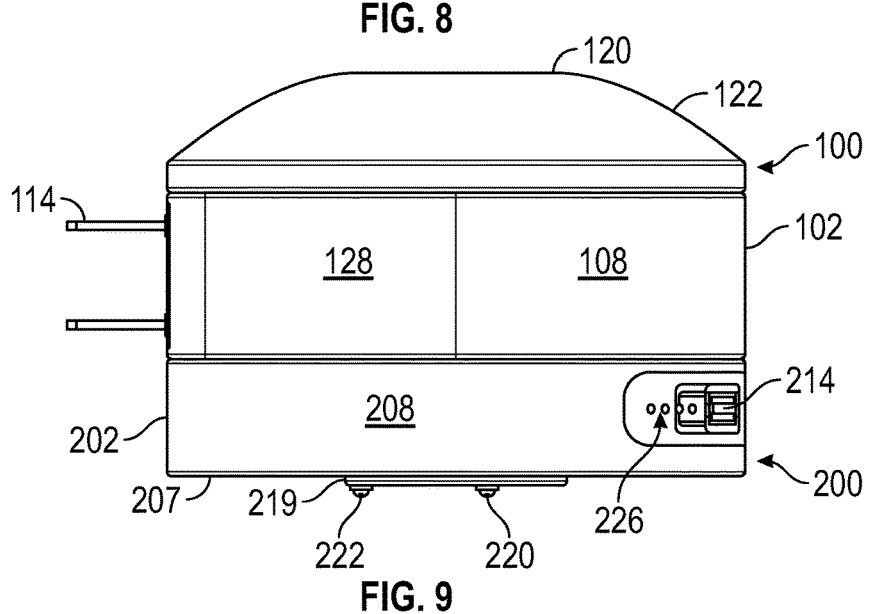
FIG. 9 shows in planar side view the assembled portable power adapter and battery unit of FIG. 1.

As shown in FIG. 8, which is a top view of the battery unit 200, the positive and negative contacts 210, 212 can be annular in shape and generally concentric with the cylindrical indentation 209 that is formed in the upper first surface 206 of the battery housing 202.

Figure 10:
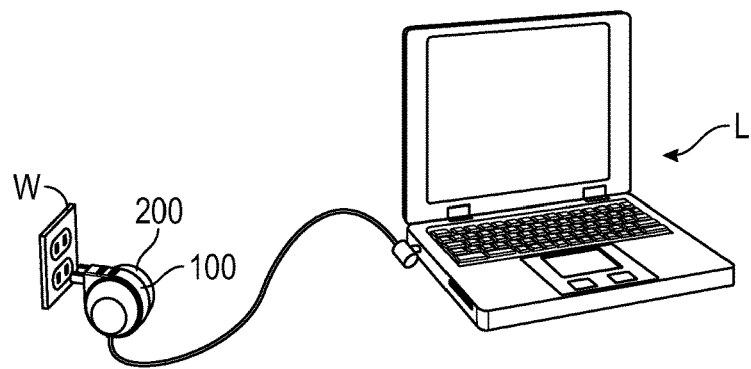
FIG. 10 shows in perspective view the portable power adapter and the battery unit of FIG. 1 in use to charge a laptop.

Referring to FIG. 10, use of the power adapter assembly of the present invention is illustrated, with the power adapter 100 and the battery unit 200 connected from a wall outlet W to a laptop L for the purpose of charging the laptop. At the same time, additional electronic devices could be charged from the power output ports 130 at the corner 128 of the power adapter 100. While so connected, the external power source can be charging the laptop, any devices connected to the power adapter assembly, and the battery unit 200. In accordance with the present invention, the power adapter assembly can be disconnected from the wall outlet W and continue to charge the laptop and any devices connected to the adapter 100 provided the battery unit 200 is attached and has a charge.

FIG. 11 shows in perspective view a slight variation of a power adapter assembly in accordance with the present invention in which the wall outlet prongs 114 are slidably movable into and out of the cavity 129, rather than pivoting.

Figure 12:
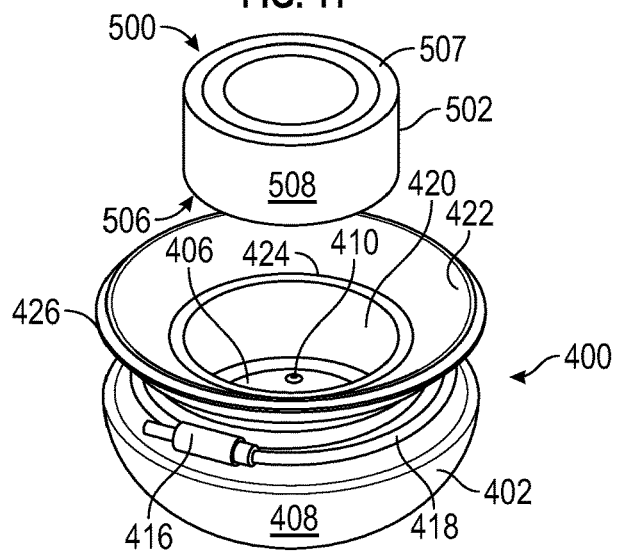
FIG. 12 shows in perspective view a portable power adapter and a detachable battery unit according to a third embodiment of the present invention.

FIG. 12 shows in perspective view an alternate embodiment of the present invention, in which a power adapter 400 is provided with a detachable battery unit 500 that may be stored within a central cavity formed in the adapter housing 402. Similar components are similarly numbered to those illustrated in the embodiments of FIGS. 1-11. The power adapter 400 includes adapter housing 402, which has a generally parabolic peripheral surface 408. A power cable 418 with a DC power connection interface 416 is operatively connected to power conversion circuitry (internal to the adapter housing 402), which is wrapped around a hollow spindle 420 defining a recess adapted for receiving the battery unit 500 as described herein. The cable 418 can be concealed by a flexible cover 422, which has an inner edge 424 that is attached to the spindle 420 and has an outer edge 426 that is movable between a closed position concealing the cable 418 and an open position exposing the cable 418 for use. The power adapter 400 includes a positive power contact 410 as well as a negative power contact (not shown), both disposed on a flat first or upper face 406 that is inside the hollow spindle 420.

Figure 14:
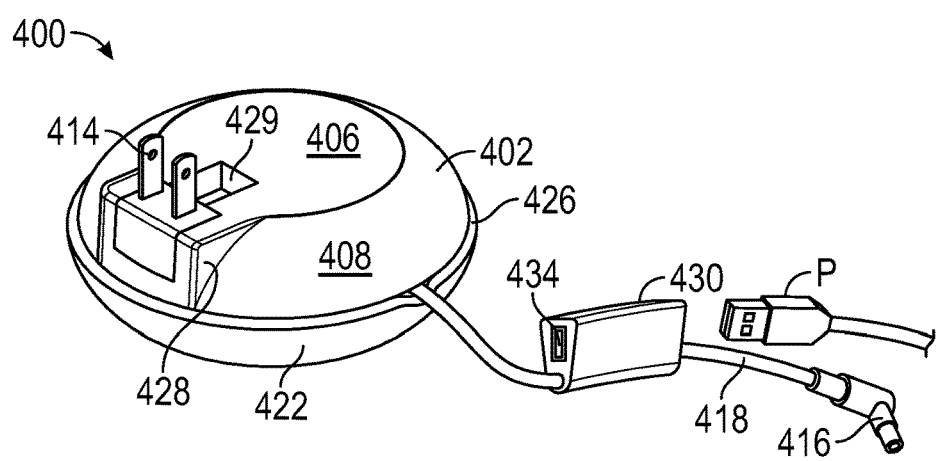
FIG. 14 shows in bottom perspective view the portable power adapter of FIG. 12.

Referring to FIG. 14, AC wall outlet prongs 414 are pivotally mounted in a corner portion 428 of the peripheral surface 408, and are operatively connected with the power cable 418 and the DC power connection interface 416 via power conversion circuitry (not shown), which is encased in the adapter housing 402.

Figure 13:
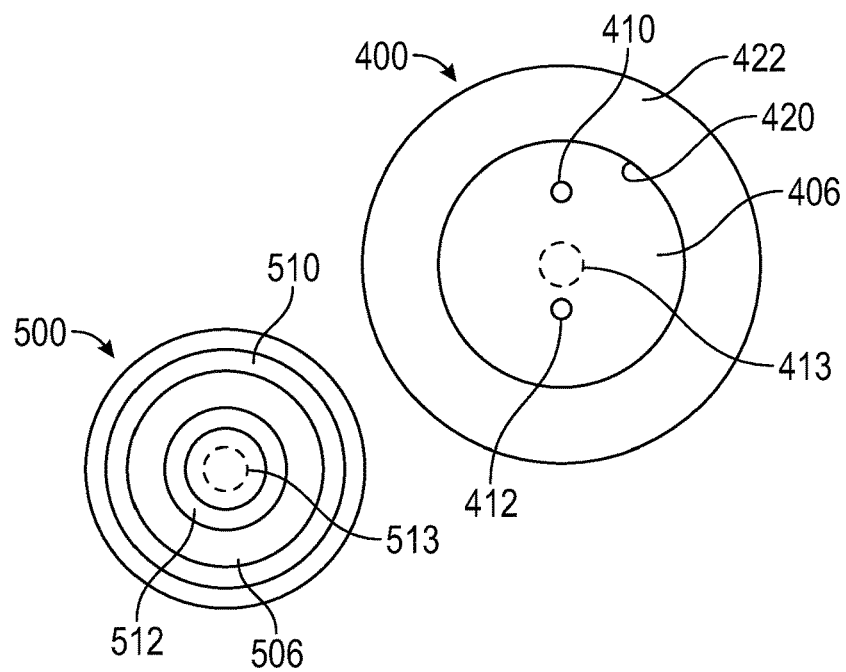
FIG. 13 shows in planar top view the power adapter and in planar bottom view the battery unit of FIG. 12.

The detachable battery unit 500 includes a battery housing 502, which has a lower surface 506, an upper surface 507, and a peripheral surface 508 designed to fit within the recess formed in the adapter 400. Referring to FIG. 13, the battery unit 500 is shown in a planar bottom view while the power adapter 400 is shown in a planar top view. At the upper surface 406 of the adapter housing 402, a positive power contact 410 and a negative power contact 412 are provided alongside a centrally located magnet 413. These contacts may be spring-loaded contact pins acting as the positive and negative contacts. On the lower surface 506 of the battery housing are positive and negative power contacts 510, 512 designed as fixed contact circles that interact with the contact pins 410, 412 on the adapter 400. The battery unit 500 further includes a magnet 513, which is centrally located among the power contacts 510, 512. The battery puck 500 can be attached and operatively connected to the power adapter 400 by interactions of the magnets 413, 513 and of the power contacts 410, 412, 510, 512, substantially as discussed above with reference to the embodiment of FIGS. 1-11. The battery unit 500 may also be designed to snap fit into the recess formed in the center of the adapter 400.

Referring to FIG. 14, which shows a bottom perspective view of the power adapter 400, the cable 418 includes an in-line power connector body 430, which houses a power connection port 434 (e.g., a USB socket) for receiving a plug P (e.g., a USB plug) for a separate connector cable preferably used to connect an electronic device to the power adapter assembly for recharging. The in-line connector body 430 is curved to conform to the spindle 420 for wrapping the cable 418 under the flexible cover 422 without inhibiting closing of the flexible cover 422 or affecting the size or aesthetics of the power adapter assembly. The in-line power connector body 430 may also house step-down power converter circuitry (not shown) for reducing the DC power plug 416 voltage (e.g., +19 VDC) to USB 2.0 specification voltage at the power socket 434. As illustrated, the in-line connector body includes at least one power connection port 434 for connecting to a connector cable. Alternative designs of such an in-line power connector body are illustrated in FIGS. 19-24.

FIG. 15 shows in perspective view a portable power adapter 600 with a detachable battery unit 700, according to another alternate embodiment of the present invention. Similar components are numbered similarly to those illustrated in the embodiments of FIGS. 1-14.

The power adapter 600 has an adapter housing 602, which includes a generally parabolic peripheral face 608. At an upper (first) face 606 of a central spindle 620, the power adapter has positive and negative power contacts 610, 612 as well as a centrally located magnet 613. A flexible cover 622 extends from the upper face 606 of the spindle 620 to the peripheral face 608. The flexible cover 622 has an outer edge 626 that is movable from a closed position proximate the peripheral face 608 to an open position distant from the adapter housing 602.

The battery unit 700 has a housing 702, which has a flat upper surface 707 and a generally parabolic housing shape tapered down to a flat lower surface 706.

Referring to FIG. 16, the portable power adapter 600 is shown alone in a bottom perspective view. The parabolic peripheral surface 608 extends to a flat bottom surface 607, in which a cavity 629 is formed for receiving AC wall outlet prongs 614 that are pivotally mounted in a corner protrusion 628. The power adapter 600 includes a power cable 618 and a DC power connection interface 616, which are operatively connected to power conversion circuitry housed in the adapter housing 602. The cable 618 includes an in-line connector body 630 much as described above. The in-line connector body 630 has a wasp-waisted or narrowed segment 632, which permits bending the connector body while wrapping the cable 618 around the spindle (not shown in this view) so as not to inhibit closing of the flexible cover 622 or affect the size or aesthetics of the power adapter assembly. The in-line connector body also includes one or more power connection ports 634, which are operatively connected to the cable conductors by additional power converter circuitry housed in the connector body 630 for connection to one or more electronic devices for recharging from the power adapter assembly.

Figure 17:
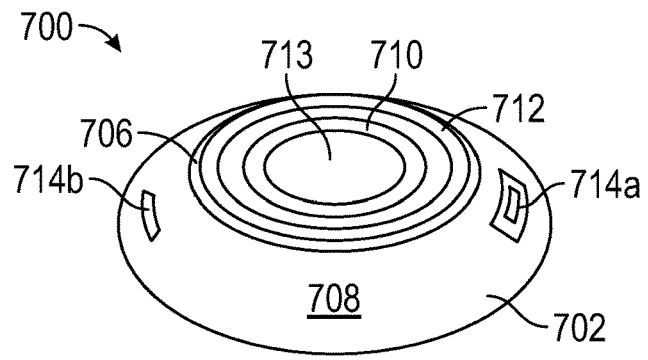
FIG. 17 shows in bottom perspective view the battery unit of FIG. 15.

Referring to FIG. 17, the battery unit 700 is shown alone in a bottom perspective view. The battery housing 702 includes a generally parabolic peripheral surface 708 as well as a flat bottom surface 706. On the bottom surface 706 there are a positive power contact 710, a negative power contact 712, and a centrally located magnet 713. In the peripheral surface 708 there are power connection ports 714—e.g., a USB power port 714a and a micro-USB power port 714b—which may act as either a power input, a power output, or both.

Figure 18:
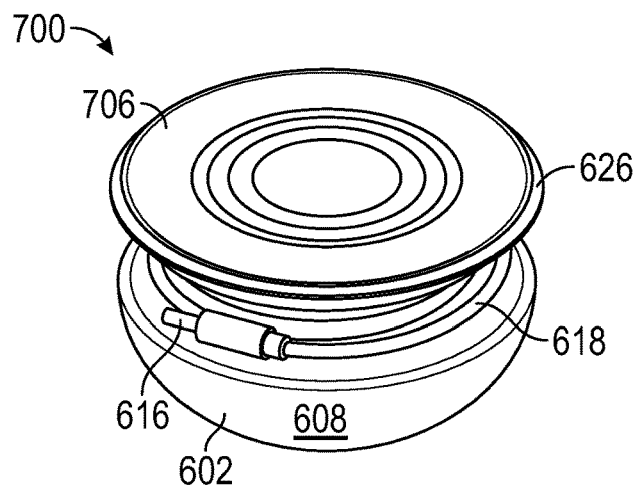
FIG. 18 shows in perspective view the assembled portable power adapter and the battery unit of FIG. 15 with a flex cover opened to expose a power cable.

As in other embodiments of the invention, the battery magnet 713 is cooperative with the adapter magnet 613 for attaching the battery unit 700 to the power adapter 600. When so attached, the power contacts 610, 612 of the adapter 600 become operatively connected with the power contacts 710, 712 of the battery unit 700. Thus, referring to FIG. 18, the battery unit 700 is shown attached to the power adapter 600. As illustrated, the flexible cover 622 is in its open position. In this embodiment, the flexible cover 622 envelopes the battery unit 700. In this regard, the battery unit 700 helps hold the shape of the flexible cover 622 and the flexible cover 622 helps hold the battery unit 700 in place so as not to break the electrical connection between the battery unit 700 and the adapter 600. With the flexible cover 622 up, the cable 618 is free to be unwrapped and wrapped in an expeditious fashion.

Figure 19:
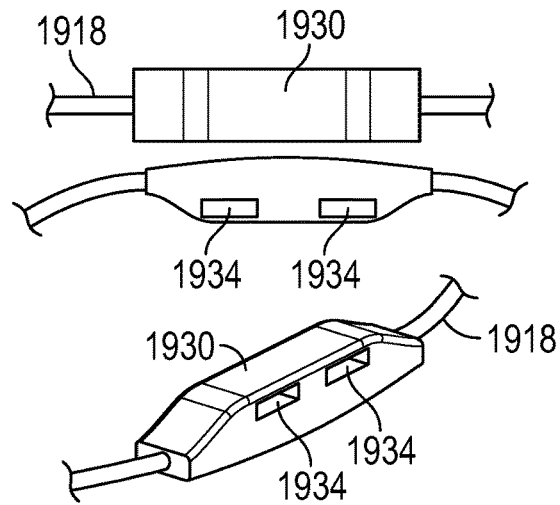
FIG. 19 shows several views of in-line power connection ports according to an alternate embodiment of the present invention.

Referring now to FIG. 19, an alternate embodiment of an in-line power connector is shown in multiple views. The power connector, which is disposed partway along a cable 1918, includes a connector body 1930 in which power connection ports 1934 are provided. The power connection ports are operatively connected with the cable 1918 by power converter circuitry, which is housed in the connector body 1930. The connector body 1930 has a generally rectangular section in one plane along the cable 1918, and has a generally trapezoidal cross-sectional shape in the orthogonal plane along the cable 1918. The power connection ports 1934 are provided in the narrowed portion of the trapezoidal section.

Figure 20:
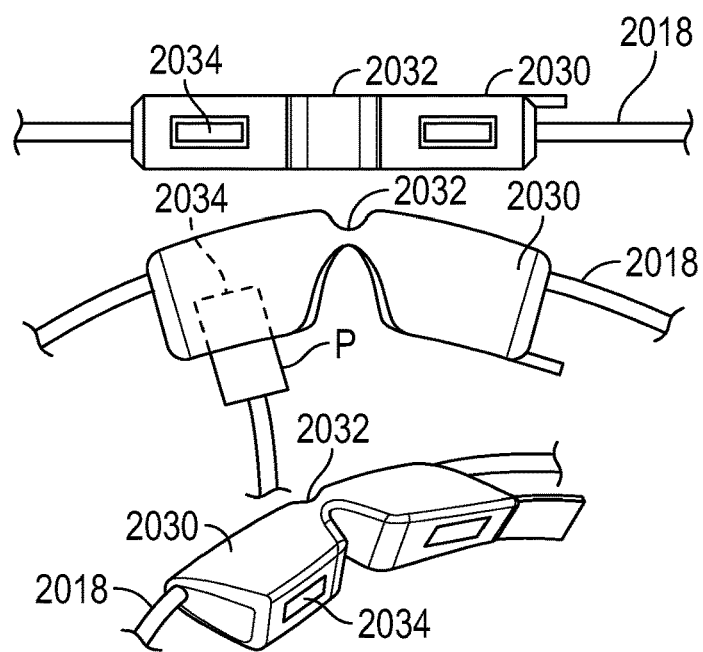
FIG. 20 shows several views of in-line power connection ports according to an alternate embodiment of the present invention.

FIG. 20 shows another alternate embodiment of an in-line power connector. The power connector includes a connector body 2030 that is disposed along a cable 2018. The connector body 2030 has a generally rectangular section in one plane along the cable 2018, and has a generally spectacle-shaped cross-sectional shape in the orthogonal plane along the cable 2018. The "bridge" 2032 of the spectacle section enables the connector body 2030 to flex and conform to wrapping the cable 2018 around the spindle of the adapter body as described above. Power connection ports 2034 are provided in the "lens" portions of the spectacle section, and a plug P is shown inserted into one of the power connection ports in a direction generally orthogonal to the cable 2018.

Figure 21:
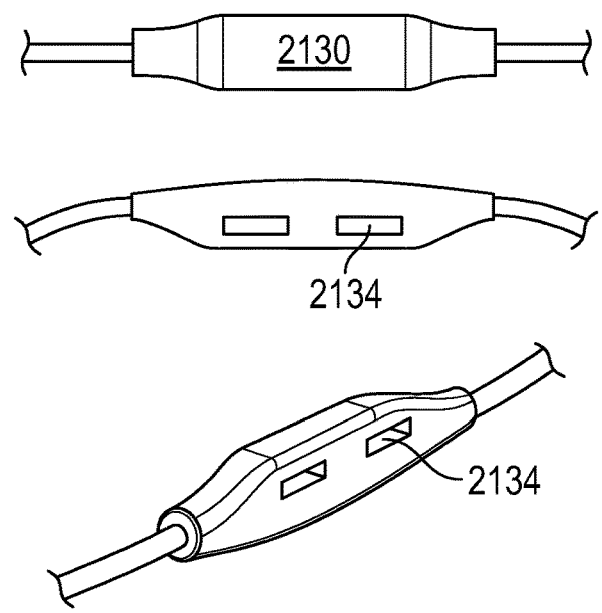
FIG. 21 shows several views of in-line power connection ports according to an alternate embodiment of the present invention.

FIG. 21 shows another alternate embodiment of an in-line power connector. This power connector differs from the power connector of FIG. 19 chiefly in having a flared shape rather than the rectangular shape shown in FIG. 19.

Figure 22:
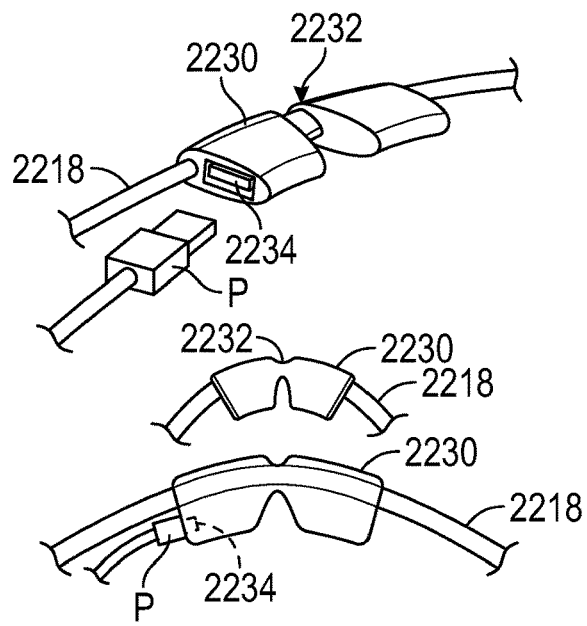
FIG. 22 shows several views of in-line power connection ports according to an alternate embodiment of the present invention.

FIG. 22 shows another alternate embodiment of an in-line power connector body, also using a spectacle-shaped in-line power connector body 2230. Similar components are numbered similarly to illustrate din FIG. 20. In this case, the connector body 2230 differs from the connector body 2030 of FIG. 20 in that the power ports 2234 are indented into the connector body 2230 generally parallel to the cable 2218. Thus, as shown, the plug P is insertable into the in-line connector 2200 in a direction generally along the length of the cable 2018.

Figure 23:
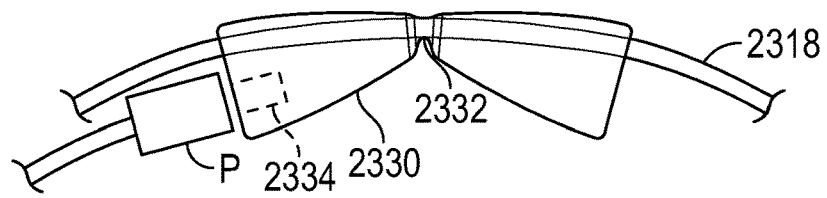
FIG. 23 shows several views of in-line power connection ports according to an alternate embodiment of the present invention.

FIG. 23 shows another alternate embodiment of an in-line power connector, using a more triangularly flared shape for the connector body 2330 than the in-line power connector body 2230 shown in FIG. 22. Similar components are numbered similarly to those illustrated in FIG. 22 and are not further described.

Figure 24:
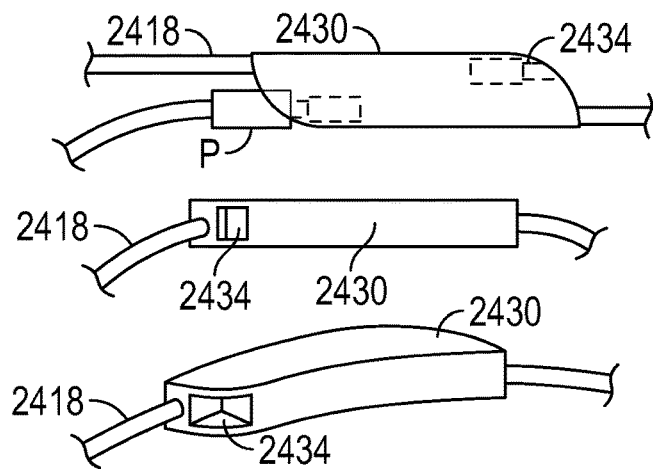
FIG. 24 shows several views of in-line power connection ports according to an alternate embodiment of the present invention.

FIG. 24 shows another alternate embodiment of an in-line power connector. In this case, the cable 2418 bends inside the power connector body 2430 so that the power connection ports 2434 are offset from each other but extend generally parallel to the cable. Thus, a plug P is shown inserted into one of the power connection ports 2434 generally along the direction of the cable 2418.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular uses contemplated.

What is claimed is:

1. A portable power adapter assembly comprising:
   (i) a power adapter comprising:
      an adapter housing that has a first face surrounded by a peripheral face;
      AC to DC power conversion circuitry disposed within the adapter housing;
      AC wall outlet prongs mounted in one of the faces and operatively connected with the power conversion circuitry;
      a DC power connection interface connected by a cable to the adapter housing, wherein the cable operatively connects the DC power connection interface with the power conversion circuitry;
      a positive power contact and a negative power contact disposed at the first face of the adapter housing and operatively connected with the power conversion circuitry; and
      a magnet disposed at the first face of the adapter housing along with the positive power contact and the negative power contact; and
   (ii) a detachable battery unit comprising:
      a battery housing that has first and second opposed faces;
      an electrolyte disposed within the housing;
      a positive power contact and a negative power contact formed at the first face of the battery housing and operatively connected with the electrolyte; and
      a magnet disposed in the first face of the battery housing adjacent the positive and negative power contacts,
      wherein, the first face of the battery housing is configured to mate with the first face of the adapter housing in complementary contact therewith, with the positive and negative power contacts of the adapter operatively connected with the respective positive and negative power contacts of the battery.

2. The portable power adapter assembly of claim 1, wherein the positive and negative power contacts of the battery unit are rings and the positive and negative power contacts of the adapter are contact pins that are spaced apart to be diametrically opposite each other on the rings.

3. The portable power adapter assembly of claim 2, wherein the positive and negative power contacts of the battery unit are concentric power contact rings.

4. The portable power adapter assembly of claim 3, wherein the magnet of the battery unit is centrally located within the power contact rings.

5. The portable power adapter assembly of claim 1, wherein the AC wall outlet prongs are pivotally mounted for movement between a deployed position protruding from the respective face and a retracted position within the respective face of the adapter housing.

6. The portable power adapter assembly of claim 3, wherein the wall outlet prongs of the power adapter are disposed in the peripheral face of the adapter housing.

7. The portable power adapter assembly of claim 1, said adapter further comprising:
   a spindle protruding from the adapter housing, opposite the first face of the adapter housing, for wrapping the cable around the spindle; and
   a flexible cover attached at an end of the spindle distal from the adapter housing, and movable from a closed position with an outer edge of the flexible cover proximate the adapter housing for concealing the wrapped cable to an open position with the outer edge of the flexible cover distant from the adapter housing for revealing the wrapped cable.

8. The portable power adapter assembly of claim 1, wherein the positive and negative power contacts of the battery unit are disposed within a recessed portion of the first face of the battery housing.

9. The portable power adapter assembly of claim 1, further comprising charged circuitry in the battery housing operatively connecting the electrolyte with the positive and negative power contacts of the battery unit.

10. The portable power adapter assembly of claim 9, further comprising at least one power output connection interface operatively connected with the electrolyte via the charging circuitry.

11. The portable power adapter assembly of claim 10, wherein the at least power output connection interface comprises a female power connection port provided on the battery housing.

12. The portable power adapter assembly of claim 1, further comprising a second positive power contact and a second negative power contact formed at the second face of the battery housing and operatively connected with the electrolyte.

13. The portable power adapter assembly of claim 12, further comprising a second magnet disposed in the second face of the battery housing adjacent the second positive and negative power contacts.

14. The portable power adapter assembly of claim 13, wherein the second magnet is aligned with the first magnet, and the second positive and negative power contacts are aligned with the respective complementary positive and negative power contacts of the first face such that the battery unit is capable of being stacked with copies of itself in electrical parallel for augmented storage capacity.

15. The portable power adapter assembly of claim 12, wherein the second positive and negative power contacts are pin contacts.

16. The portable power adapter assembly of claim 12, wherein the second positive and negative power contacts are concentric power contact rings.

17. The portable power adapter assembly of claim 16, wherein the second magnet of the battery unit is centrally located within the second set of power contact rings.

18. The portable power adapter assembly of claim 12, further comprising charged circuitry in the battery housing operatively connecting the first positive and negative power contacts of the battery unit with the second positive and negative power contacts.

19. A portable power adapter assembly comprising:
   (i) a power adapter comprising:

an adapter housing that has a first face surrounded by a peripheral face;

AC to DC power conversion circuitry disposed within the adapter housing;

AC wall outlet prongs mounted in one of the faces and operatively connected with the power conversion circuitry;

a DC power connection interface connected by a cable to the adapter housing, wherein the cable operatively connects the DC power connection interface with the power conversion circuitry;

a positive power contact and a negative power contact disposed at the first face of the adapter housing and operatively connected with the power conversion circuitry; and a magnet disposed at the first face of the adapter housing along with the positive power contact and the negative power contact; and (ii) a detachable battery unit comprising:

a battery housing that has first and second opposed faces and a rechargeable battery disposed therein;

a positive power contact and a negative power contact formed at the first face of the battery housing and operatively connected with the rechargeable battery; and a magnet disposed in the first face of the battery housing adjacent the positive and negative power contacts, wherein, the first face of the battery housing is configured to mate with the first face of the adapter housing in complementary contact therewith, with the positive and negative power contacts of the adapter operatively connected with the respective positive and negative power contacts of the battery.

20. The portable power adapter assembly of claim 19, the detachable battery unit further comprising:

a second positive power contact and a second negative power contact formed at the second face of the battery housing and operatively connected with the rechargeable battery; and a second magnet disposed in the second face of the battery housing adjacent the second positive and negative power contacts, wherein the second magnet is aligned with the first magnet, and the second positive and negative power contacts are aligned with the respective complementary positive and negative power contacts of the first face such that the battery unit is capable of being stacked with copies of itself in electrical parallel for augmented storage capacity.

* * * * *